US010761553B2

(12) United States Patent
Sporck et al.

(10) Patent No.: US 10,761,553 B2
(45) Date of Patent: Sep. 1, 2020

(54) UNIVERSAL SERIAL BUS (USB) CABLE TYPE DETECTION AND CONTROL TECHNIQUES

(71) Applicant: QUALCOMM Incorporated, San Diego, CA (US)

(72) Inventors: Christian Gregory Sporck, Campbell, CA (US); Shashank Prakash Mane, San Jose, CA (US); Giuseppe Pinto, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 15/618,244

(22) Filed: Jun. 9, 2017

(65) Prior Publication Data

US 2017/0364114 A1    Dec. 21, 2017

Related U.S. Application Data

(60) Provisional application No. 62/351,595, filed on Jun. 17, 2016.

(51) Int. Cl.
*G05F 3/08*    (2006.01)
*G06F 1/26*    (2006.01)
(Continued)

(52) U.S. Cl.
CPC ............... *G05F 3/08* (2013.01); *G06F 1/266* (2013.01); *G06F 13/4295* (2013.01);
(Continued)

(58) Field of Classification Search
CPC ............ G05F 3/08; G06F 1/266; H01R 24/28
(Continued)

(56) References Cited

U.S. PATENT DOCUMENTS 8,918,549 B2    12/2014  Waters
9,400,546 B1 *   7/2016  Agarwal ............... G06F 1/3215
(Continued)

FOREIGN PATENT DOCUMENTS

CN    205071173 U    3/2016
EP    2924584 A2     9/2015
(Continued)

OTHER PUBLICATIONS

Rogers, Andrew, "Introduction to USB Type-C™," Microchip Technology Inc., Jan. 30, 2015, 20 pages, Retrieved from the Internet: ww1.microchip.com/downloads/en/AppNotes/00001953A.pdf.
(Continued)

*Primary Examiner* — David V Henze-Gongola
*Assistant Examiner* — Tarikh Kanem Rankine
(74) *Attorney, Agent, or Firm* — Withrow & Terranova, PLLC (57) ABSTRACT

Universal Serial Bus (USB) cable type detection and control techniques are disclosed. In an exemplary aspect, a device connected to a cable detects whether the cable is a legacy cable (i.e., a Type-A to Type-C cable). If the cable is a legacy cable, the device determines an appropriate current to draw based on whether the cable is compliant with the USB Type-C specification or non-compliant. Additional exemplary aspects of the present disclosure determine whether a connector adaptor has been put on a legacy cable and determines an appropriate current to draw based on the capabilities of the legacy cable. Still further aspects of the present disclosure evaluate not only the cable to see if the cable limits the current draw, but also evaluate a device at a distal end of the cable to verify if and how current may be drawn by such remote device from a mobile terminal.

21 Claims, 9 Drawing Sheets

(51) Int. Cl.
  *G06F 13/42* (2006.01)
  *H01R 24/28* (2011.01)
  *H01R 24/60* (2011.01)
  *H02J 7/00* (2006.01)
  *H01R 107/00* (2006.01)

(52) U.S. Cl.
  CPC .............. *H01R 24/28* (2013.01); *H01R 24/60* (2013.01); *H02J 7/0072* (2013.01); *G06F 13/4282* (2013.01); *H01R 2107/00* (2013.01)

(58) Field of Classification Search
  USPC ........................................................ 320/111
  See application file for complete search history.

(56) References Cited

U.S. PATENT DOCUMENTS

| | | | |
|---|---|---|---|
| 9,577,372 B1* | 2/2017 | Kakish | H01R 13/6205 |
| 2008/0126594 A1* | 5/2008 | Monks | G06F 1/266 |
| | | | 710/17 |
| 2013/0217274 A1 | 8/2013 | Bar-Niv et al. | |
| 2015/0142993 A1 | 5/2015 | Blanc et al. | |
| 2015/0346790 A1* | 12/2015 | Talmola | G06F 1/266 |
| | | | 710/104 |
| 2015/0363350 A1* | 12/2015 | Yeung | G06F 13/4221 |
| | | | 710/106 |
| 2015/0370299 A1 | 12/2015 | Waters | |
| 2016/0093994 A1 | 3/2016 | Chen et al. | |
| 2016/0163480 A1* | 6/2016 | Lester | G06F 1/30 |
| | | | 713/300 |
| 2016/0179648 A1* | 6/2016 | Srivastava | G06F 13/4295 |
| | | | 710/16 |
| 2016/0253282 A1* | 9/2016 | Bowers | G06F 13/102 |
| | | | 710/316 |
| 2016/0291663 A1* | 10/2016 | Sun | G06F 13/4022 |
| 2016/0336698 A1* | 11/2016 | Chang | H05K 1/18 |
| 2016/0336761 A1* | 11/2016 | Hsu | H02J 7/007 |
| 2016/0342492 A1* | 11/2016 | Chen | G06F 13/4282 |
| 2016/0350251 A1* | 12/2016 | Lee | G06F 13/4282 |
| 2016/0364360 A1* | 12/2016 | Lim | H03M 1/12 |
| 2016/0372936 A1* | 12/2016 | Agarwal | H02J 7/007 |
| 2016/0378155 A1* | 12/2016 | Inha | G06F 1/3287 |
| | | | 710/313 |
| 2016/0378704 A1* | 12/2016 | Adamson | G06F 13/364 |
| | | | 710/104 |
| 2017/0005447 A1* | 1/2017 | Kim | H01R 13/6616 |
| 2017/0039153 A1* | 2/2017 | Chen | G06F 13/385 |
| 2017/0124016 A1* | 5/2017 | Gerber | G06F 13/385 |
| 2017/0293347 A1* | 10/2017 | Wood, III | G06F 13/4282 |

FOREIGN PATENT DOCUMENTS

| | | |
|---|---|---|
| WO | 2015048105 A1 | 4/2015 |
| WO | WO-2017161750 A1 * | 9/2017 |

OTHER PUBLICATIONS

International Search Report and Written Opinion for PCT/US2017/037005, dated Sep. 13, 2017, 13 pages.
International Preliminary Report on Patentability for International Patent Application No. PCT/US2017/037005, dated Dec. 27, 2018, 7 pages.

* cited by examiner

UNIVERSAL SERIAL BUS (USB) CABLE TYPE DETECTION AND CONTROL TECHNIQUES

PRIORITY CLAIM

The present application claims priority to U.S. Provisional Patent Application Ser. No. 62/351,595, filed on Jun. 17, 2016 and entitled "UNIVERSAL SERIAL BUS (USB) CABLE TYPE DETECTION AND CONTROL TECHNIQUES," the contents of which is incorporated herein by reference in its entirety.

BACKGROUND

I. Field of the Disclosure

The technology of the disclosure relates generally to Universal Serial Bus (USB) cables and particularly to cables including a USB Type-C connector.

II. Background

Computing devices have become ubiquitous in contemporary society. One of the reasons for the increase in numbers of computing devices is the increased functionality and versatility that can now be found in computing devices. In addition, computing devices are now capable of interoperation with multiple peripheral devices. Several specifications, standards, and protocols have emerged to assist in facilitating such interoperation. One popular specification is the Universal Serial Bus (USB) specification. The USB specification has evolved from its introductory version into versions 3.0 and 3.1. Further, the connectors that are used with USB have been standardized to Type-A, Type-B, and Type-C with micro and mini versions of Type-B connectors also standardized.

Responding to complaints that Type-A connectors had to be inserted into complementary receptacles in a particular orientation, Type-C connectors are reversible in that they may operate regardless of insertion orientation. The Type-C connector specification allows for a greater data bandwidth by providing additional data lanes. Furthermore, the Type-C connector specification contemplates a command and control (CC) conductor through which various out-of-band communication types may be made.

The myriad options that exist have caused a number of different cables to be introduced and sold. For example, some AMAZON KINDLE devices may receive power from a wall outlet through a plug that is coupled to a Type-A connector and then through a cable to a micro-USB Type-B connector. Likewise, the advent of the Type-C connectors has caused a proliferation of Type-A to Type-C cables that allow interconnection from a legacy device having a Type-A connection to a Type-C compatible device.

The Type-C connector specification addresses the concept of a Type-A to Type-C cable. That is, because the Type-A connector specification does not have a CC pin, the Type-C connector specification contemplates that the Type-A to Type-C cable will have a fifty-six kilo-ohm (56 k$\Omega$) resistor in the Type-C side coupling its respective CC pin to its respective Vbus pin. Unfortunately, the original drafts of the Type-C connector specification were often misinterpreted and some cable manufacturers sold cables that only had a 10 k$\Omega$ resistor coupling the Vbus pin and the CC pin, and some cable manufacturers sold cables that had a short circuit between the CC pin and the Vbus pin. The error in the size of the resistor means that the peripheral will interpret the source as being capable of supporting three amperes (3 A) of current, and the peripheral will attempt to draw 3 A of current from the power source. In certain instances, attempting to draw such current may cause the USB port on the host to shut down or even damage the USB port on the host. Still other situations arise where the peripheral may improperly assess the nature of the cable and incorrectly identify an optimal amount of current to draw from the host. Accordingly, there needs to be a better way to determine what type of cable is being used and determine an optimal current to draw from the host.

SUMMARY OF THE DISCLOSURE

Aspects disclosed in the detailed description include Universal Serial Bus (USB) cable type detection and control techniques. In an exemplary aspect, a device (sometimes referred to as a peripheral) connected to a cable detects whether the cable is a legacy cable (i.e., a Type-A to Type-C cable). If the cable is a legacy cable, the device determines an appropriate current to draw based on whether the cable is compliant with the USB Type-C specification or non-compliant. Additional exemplary aspects of the present disclosure determine whether a connector adaptor (sometimes also referred to as a converter) has been put on a legacy cable and determines an appropriate current to draw based on the capabilities of the legacy cable. Still further aspects of the present disclosure evaluate not only the cable to see if the cable limits the current draw, but also evaluate a device at a distal end of the cable to verify if and how current may be drawn by such remote device from a mobile terminal.

By evaluating the cable and/or the remote device, a device may determine an appropriate current draw and current direction. By determining the appropriate current draw and current direction, the host is protected from inadvertent shut down or damage caused by excess current. Still further, in instances where the device is able to draw current, the device may select a maximal current so that charging takes place in the most expeditious manner possible. Such rapid charging improves user experience.

In this regard in one aspect, a method for controlling current levels on a USB cable is disclosed. The method includes detecting whether a cable is a legacy Type-A to Type-C cable. The method also includes detecting whether the cable is compliant or not compliant with a USB Type-C specification. The method also includes setting a current draw based on whether the cable is legacy or not legacy and on whether the cable is compliant or not compliant with the USB Type-C specification.

In another aspect, a dongle is disclosed. The dongle includes a first interface configured to attach to a USB cable. The dongle also includes a second interface configured to plug into a USB device. The dongle also includes a control system operatively coupled to the first interface and the second interface. The control system is configured to detect whether a cable plugged into the first interface is a legacy Type-A to Type-C cable. The control system is also configured to detect whether the cable is compliant or not compliant with a USB Type-C specification. The control system is also configured to set a current draw based on whether the cable is legacy or not legacy and on whether the cable is compliant or not compliant with the USB Type-C specification.

In another aspect, a USB device is disclosed. The USB device includes a receptacle configured to receive a USB cable. The USB device also includes a control system operatively coupled to the receptacle. The control system is configured to detect whether a cable plugged into the receptacle is a legacy Type-A to Type-C cable. The control system is also configured to detect whether the cable is compliant or not compliant with a USB Type-C specification. The control system is also configured to set a current draw based on whether the cable is legacy or not legacy and on whether the cable is compliant or not compliant with the USB Type-C specification.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include Universal Serial Bus (USB) cable type detection and control techniques. In an exemplary aspect, a device (sometimes referred to as a peripheral) connected to a cable detects whether the cable is a legacy cable (i.e., a Type-A to Type-C cable). If the cable is a legacy cable, the device determines an appropriate current to draw based on whether the cable is compliant with the USB Type-C specification or non-compliant. Additional exemplary aspects of the present disclosure determine whether a connector adaptor (sometimes also referred to as a converter) has been put on a legacy cable and determines an appropriate current to draw based on the capabilities of the legacy cable. Still further aspects of the present disclosure evaluate not only the cable to see if the cable limits the current draw, but also evaluate a device at a distal end of the cable to verify if and how current may be drawn by such remote device from a mobile terminal.

By evaluating the cable and/or the remote device, a device may determine an appropriate current draw and current direction. By determining the appropriate current draw and current direction, the host is protected from inadvertent shut down or damage caused by excess current. Still further, in instances where the device is able to draw current, the device may select a maximal current so that charging takes place in the most expeditious manner possible. Such rapid charging improves user experience.

Figure 1A:
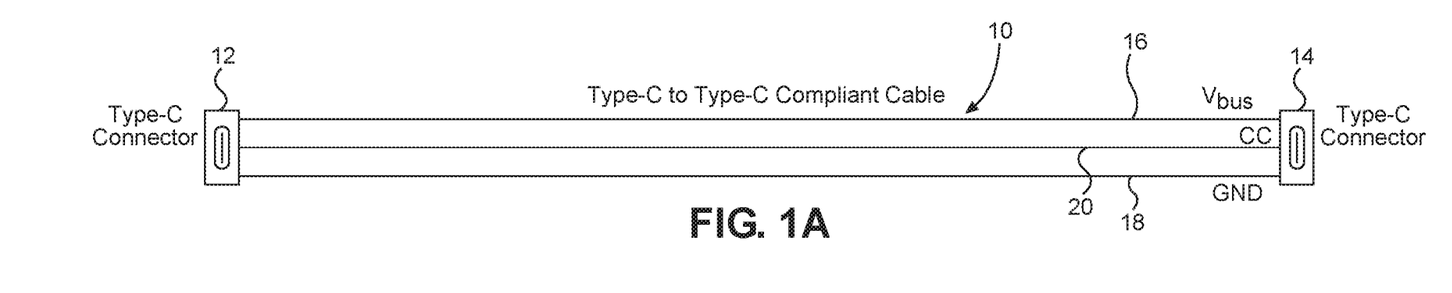
FIG. 1A illustrates an exemplary compliant Type-C to Type-C Universal Serial Bus (USB) cable.

Before addressing specific solutions to legacy cable issues, a brief overview of various USB cable configurations is provided with references to FIGS. 1A-1H. In this regard, FIG. 1A illustrates an exemplary compliant Type-C to Type-C USB cable. In particular, FIG. 1A illustrates a USB cable 10 having a first connector 12 that is a Type-C connector and a second connector 14 that is a Type-C connector. The USB cable 10 further includes a plurality of internal conductive elements including at least one conductive element 16 purposed for carrying a Vbus power signal, a second conductive element 18 purposed to be coupled to ground, and a third conductive element 20 to carry command and control (CC) signals. While not illustrated, it should be appreciated that the Type-C specification specifically contemplates that two Vbus conductive elements, two CC conductive elements, and two ground conductive elements are contained within the USB cable 10. When both the first connector 12 and the second connector 14 are Type-C connectors, the third conductive element 20 for the CC signals terminates at each of the connectors 12 and 14, and devices coupled thereto may send signals over the third conductive element 20 according to the USB Type-C specification.

Figure 1B:
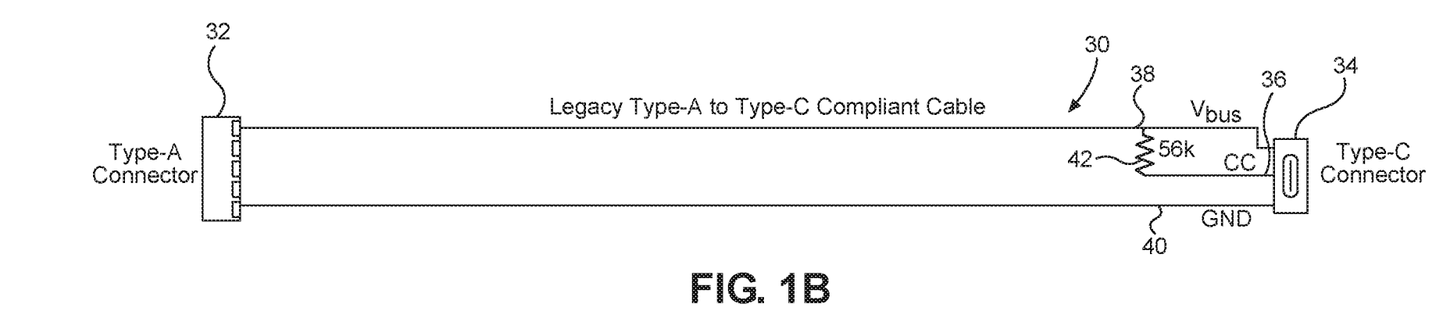
FIG. 1B illustrates an exemplary legacy compliant Type-A to Type-C USB cable.

However, when one of the connectors on a cable is a legacy Type-A connector, the Type-A connector does not have a corresponding CC termination. The USB specification outlines how the connector should be terminated. In this regard, FIG. 1B illustrates an exemplary legacy compliant Type-A to Type-C USB cable 30. The cable 30 includes a first connector 32, which is a Type-A connector. As such, the first connector 32 does not have a CC pin and the cable 30 does not have a conductive element configured to carry CC signals. The cable 30 further includes a second connector 34, which is a Type-C connector. Because the second connector 34 is a Type-C connector, the second connector 34 has a CC pin 36. Likewise, the cable 30 includes a Vbus conductive element 38 and a ground conductive element 40. According to the USB specification, the CC pin 36 is connected to the Vbus conductive element 38 through a fifty-six kilo-ohm (56 kΩ) resistor 42. Note that the USB Type-C specification allows for a +/−5% deviation. The presence of the connection between the CC pin 36 and the Vbus conductive element 38 allows a device (not shown) coupled to the second connector 34 to see a voltage presented at the corresponding CC pin of the device. Based on the value of such voltage, the device into which the second connector 34 is plugged may ascertain that the cable 30 is a legacy Type-A to Type-C USB cable and draw an appropriate current through the cable 30 for charging purposes.

Figure 1C:
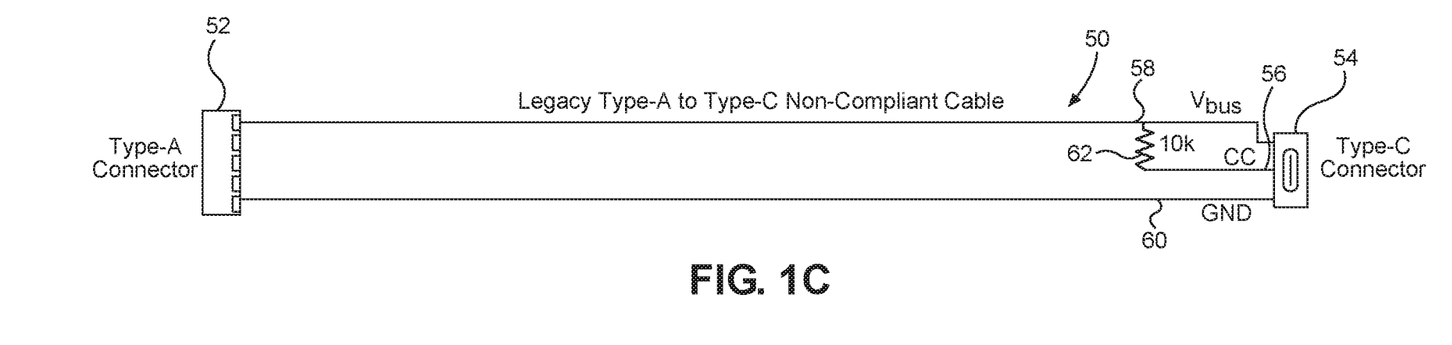
FIG. 1C illustrates an exemplary legacy non-compliant Type-A to Type-C USB cable.

While the USB specification specifies that the resistor 42 be 56 kΩ, the prose of the specification was sufficiently unclear that many manufacturers did not use a 56 kΩ resistor. In this regard, FIG. 1C illustrates an exemplary legacy non-compliant Type-A to Type-C USB cable 50 that is non-compliant because it does not use a 56 kΩ resistor. In particular, the cable 50 includes a first connector 52, which is a Type-A connector. As noted above, Type-A connectors do not have a CC pin and the cable 50 does not have a conductive element configured to carry CC signals. The cable 50 further includes a second connector 54, which is a Type-C connector. Because the second connector 54 is a Type-C connector, the second connector 54 has a CC pin 56. Likewise, the cable 50 includes a Vbus conductive element 58 and a ground conductive element 60. In place of a specification mandated 56 kΩ resistor, the cable 50 has a 10 kΩ resistor 62. This 10 kΩ resistor 62 still allows the presentation of a voltage at the CC pin 56, but that voltage is not calibrated relative to Vbus in the manner expected by a Type-C device (i.e., Vbus/56 kΩ is different than Vbus/10 kΩ). Based on this calculation, a device coupled to the second connector 54 may conclude that the device may draw three amperes (3 A) of current. Accordingly, the device may draw more current than a remote Type-A host or the cable 50 can accommodate. This excessive current draw may result in a shut down or damage to the host. Neither situation is desirable. While 10 kΩ is common in such non-compliant legacy cables, other non-56 kΩ values will likewise skew the allowable current draw calculation. Thus, it should be appreciated that this description is true for any value other than 56 kΩ.

Figure 1D:
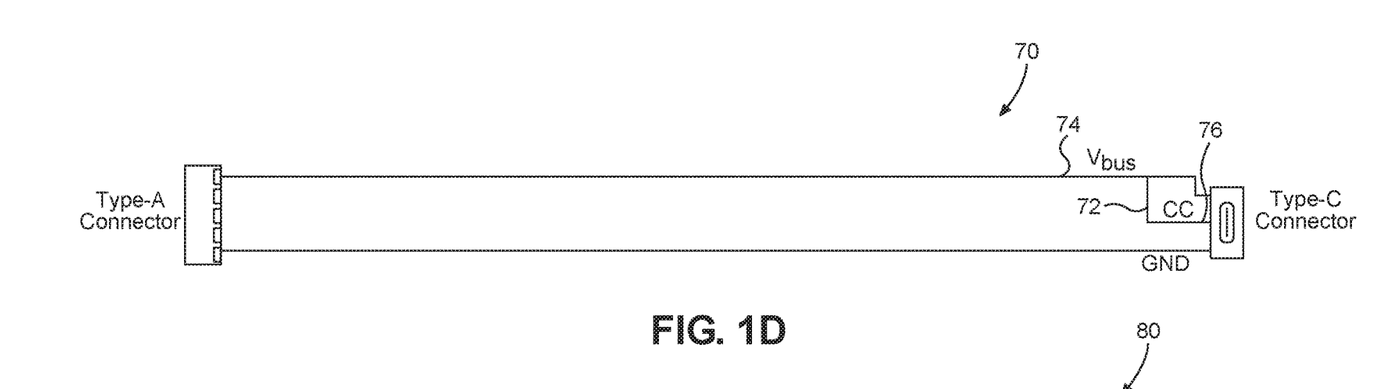
FIG. 1D illustrates a second exemplary legacy non-compliant Type-A to Type-C USB cable.

Some manufacturers did not even provide a resistor. In this regard, FIG. 1D illustrates a second exemplary legacy non-compliant Type-A to Type-C USB cable 70 with a short 72 between a Vbus line 74 and a CC pin 76. The short 72 means that Vbus is presented at the CC pin 76 instead of having a resistor divider, which in turn causes the device to misinterpret the available current.

Figure 1E:
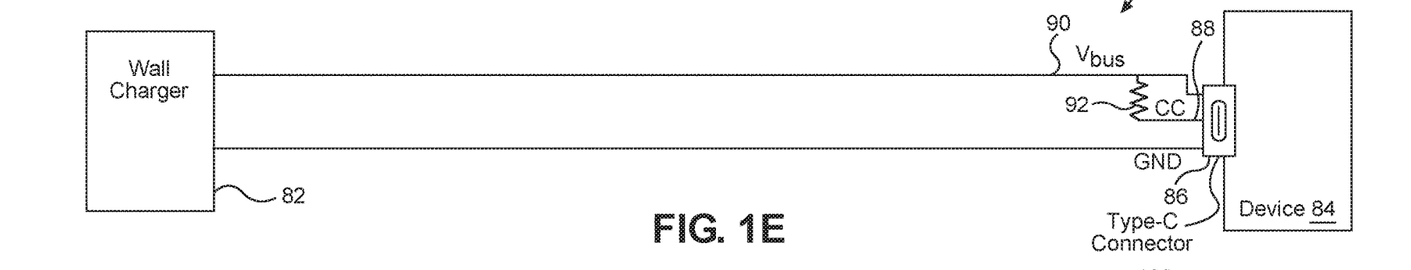
FIG. 1E illustrates an exemplary compliant captive to Type-C USB cable connection between a wall charger and a device.

While the situation on a device-to-device cable is illustrated in FIGS. 1A-1D, USB cables are not limited to device-to-device use. In this regard, FIG. 1E illustrates an exemplary compliant captive to Type-C USB cable 80 between a wall charger 82 and a device 84. The cable 80 has a Type-C connector 86 with a connection between a CC pin 88 and a Vbus conductive element 90. The connection includes a USB compliant 56 kΩ resistor 92. Because the voltage at the CC pin 88 is proper, the device 84 may draw an appropriate amount of current from the wall charger 82.

Figure 1F:
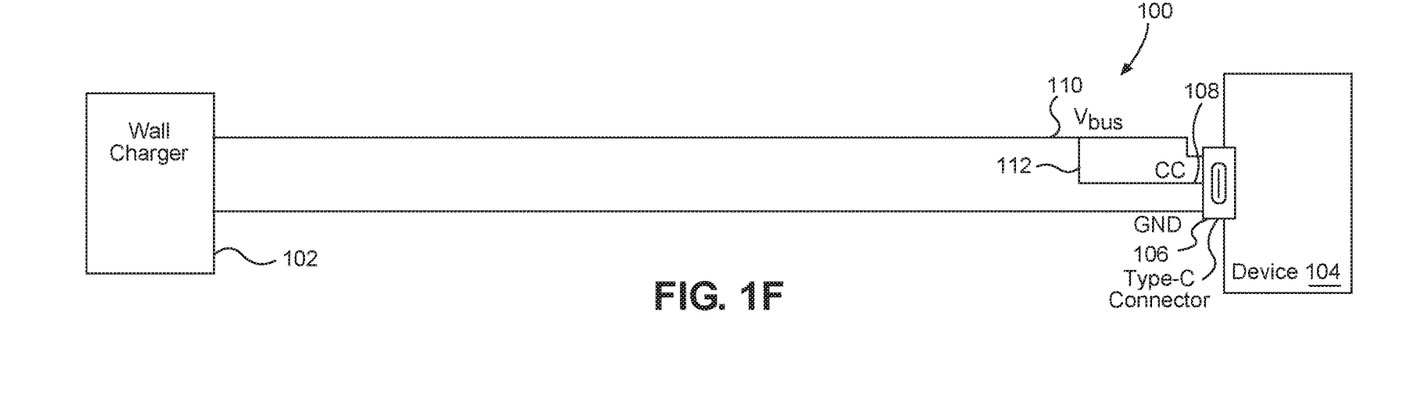
FIG. 1F illustrates an exemplary non-compliant captive to Type-C USB cable connection between a wall charger and a device.

In contrast to the compliant arrangement of FIG. 1E, FIG. 1F illustrates an exemplary non-compliant captive to Type-C USB cable 100 between a wall charger 102 and a device 104. The cable 100 has a Type-C connector 106 with a connection between a CC pin 108 and a Vbus conductive element 110. The connection includes a short circuit 112. As noted above, when a short circuit or a non-compliant resistor is used, the device may draw an inappropriate amount of current.

Figure 1G:
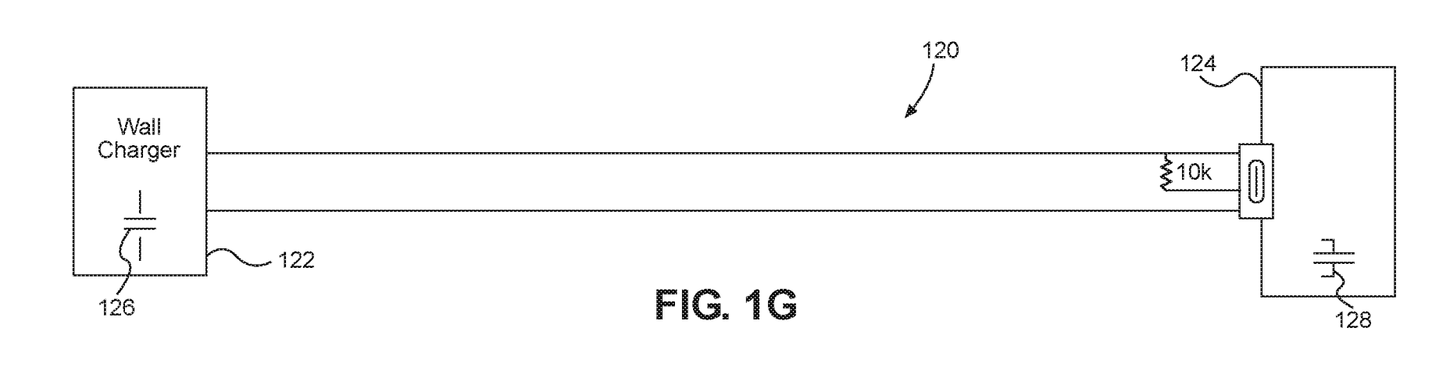
FIG. 1G illustrates an exemplary non-compliant captive to Type-C cable connection between an unplugged wall charger and a device (i.e., not captured)

FIGS. 1E and 1F assume that the wall chargers 82 and 102 are, in fact, plugged into a wall outlet or other power source. However, there may be situations where the wall chargers 82 and 102 are not plugged into such a wall outlet (i.e., the cable is not captive). FIG. 1G illustrates an exemplary non-compliant captive to Type-C cable 120 between an unplugged (i.e., not captive) wall charger 122 and a device 124. The wall charger 122 has a fairly large capacitor 126 therein that is used to assist in the alternating current to direct current conversion for use on the cable 120. If the device 124 is a dual mode device that can be charged or draw a charge, the device 124 may misinterpret the absence of power at the wall outlet to mean that the wall charger 122 needs to be charged from a battery 128 of the device 124. Since this is the opposite of what is usually desired, the ability to detect such a situation is desirable.

Figure 1H:
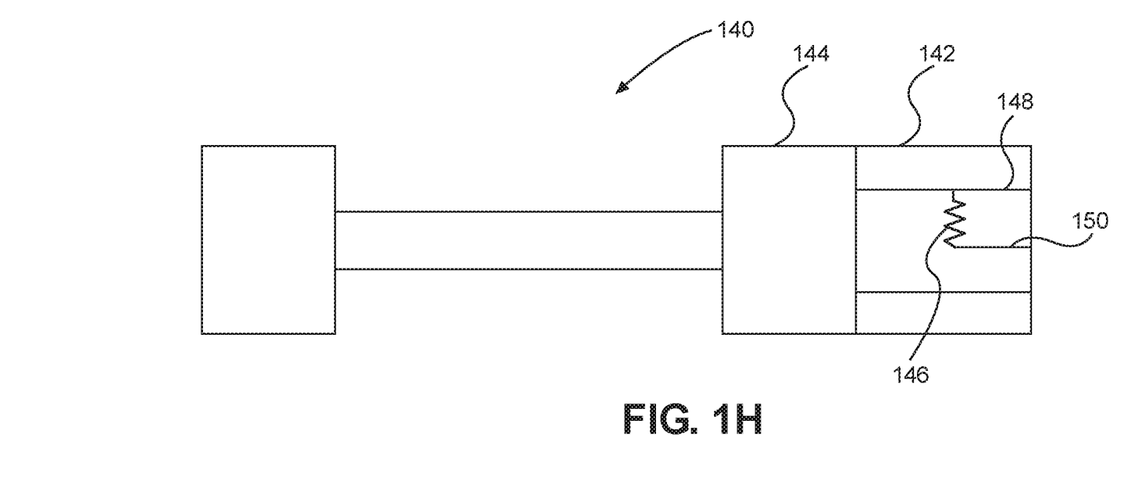
FIG. 1H illustrates an exemplary legacy compliant micro-USB Type-B cable with a connector adaptor converting micro-USB Type-B to Type-C for one end of the cable.

Still another situation may arise where the device may misinterpret the available current for charging. Such situation arises when a connector adaptor or cable converter is used. In this regard, FIG. 1H illustrates an exemplary legacy compliant micro-USB Type-B cable 140 with a connector adaptor 142 positioned on a connector 144 of the cable 140. An exemplary connector adaptor 142 is the USB-C to Micro USB Adaptor sold by 3cMaker. The connector adaptor 142 converts the connector 144 to a Type-C connector. As such, the connector adaptor 142 may include a proper 56 kΩ resistor 146 between a Vbus conductive element 148 and a CC pin 150. In such situations, the corresponding device will see that the connector adaptor 142 is USB compliant and assume that the cable 140 is a Legacy to Type-C cable and attempt to draw more current than the legacy cable 140 can support. That is, the legacy cable 140 can handle 1.5 A. If a proprietary charging method is used (which is allowed in the USB Type-C specification), such proprietary charging method can overload the legacy cable 140.

Figure 2:
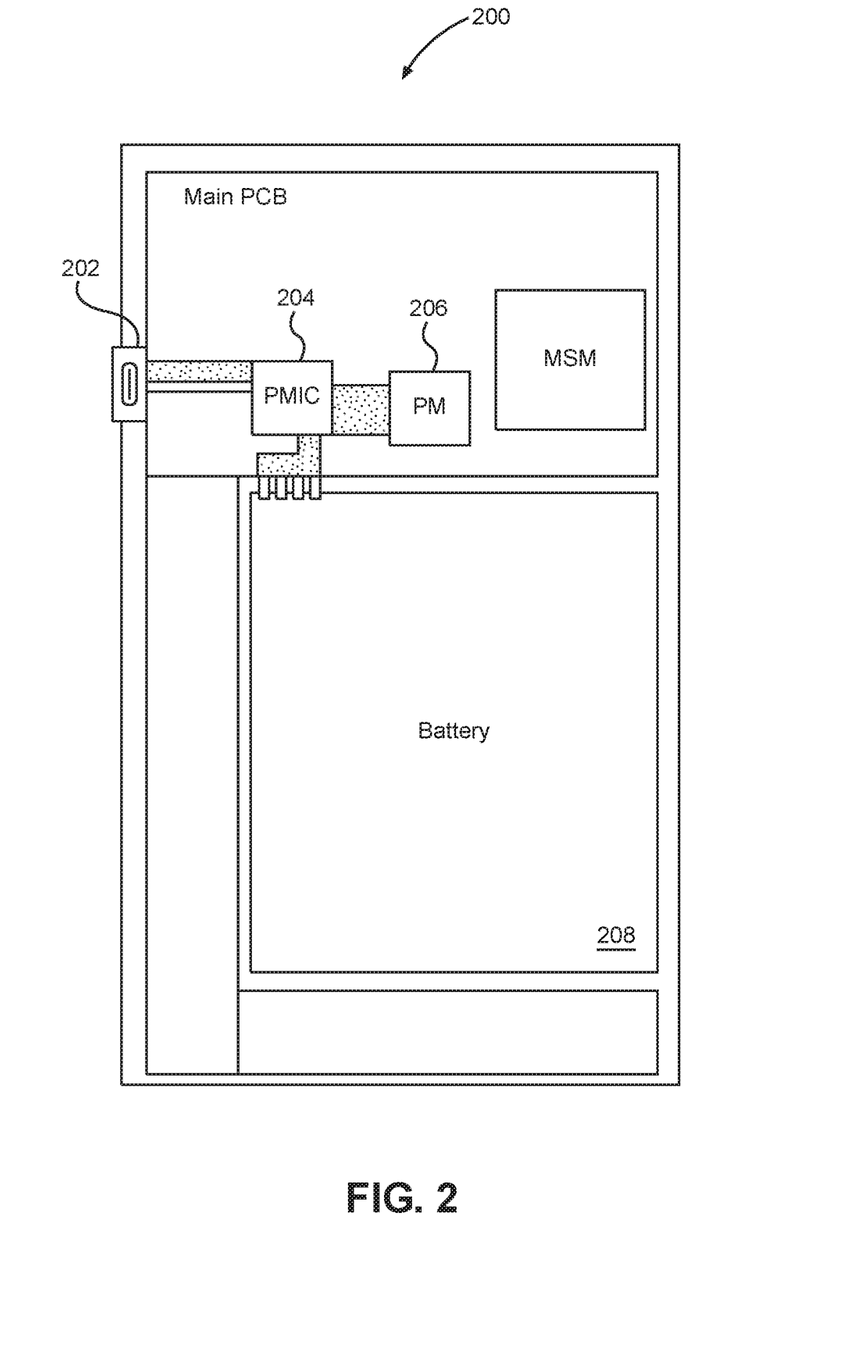
FIG. 2 illustrates a simplified block diagram of a device configured to implement exemplary aspects of the present disclosure.
Figure 3:
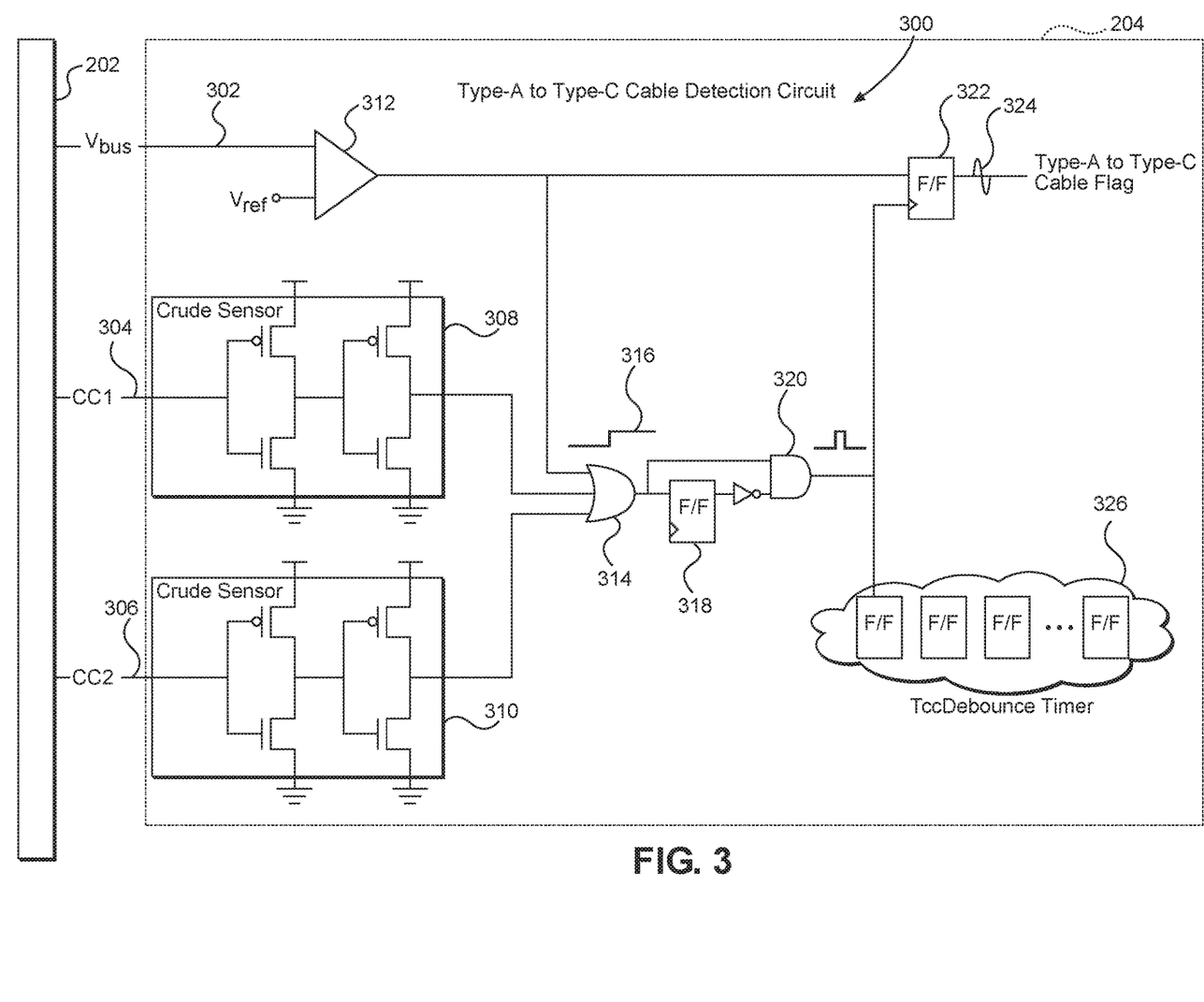
FIG. 3 illustrates a simplified block diagram of a sensor used to detect voltage at Vbus and command and control (CC) pins at a cable interface.

Exemplary aspects of the present disclosure allow for better detection techniques to detect what type of cable is present and what is an appropriate amount of current to draw given the cable type, remote source, and whether there is an adaptor or the like. Proper cable type determination avoids the problems identified above and allows for optimal charging. FIGS. 2 and 3 provide additional exemplary hardware elements used by aspects of the present disclosure followed by flowcharts describing the processes of the present disclosure.

In this regard, FIG. 2 illustrates a device 200 having a Type-C USB receptacle 202 that is configured to couple to a USB cable, such as those described above. The USB receptacle 202 is coupled to a power management integrated circuit (PMIC) 204 and a power manager 206 (also labeled PM in FIG. 2). The PMIC 204 is coupled to a battery 208.

FIG. 3 illustrates a sensor circuit 300 associated with the USB receptacle 202. In particular, the sensor circuit 300 may be located in the PMIC 204 of FIG. 2 and includes a Vbus input 302, a CC1 input 304, and a CC2 input 306. It should be appreciated that the Vbus input 302 couples to a Vbus pin in the USB receptacle 202; the CC1 input 304 couples to a CC1 pin in the USB receptacle 202; and the CC2 input 306 couples to a CC2 pin in the USB receptacle 202. A crude sensor 308 is associated with the CC1 input 304, and a second crude sensor 310 is associated with the CC2 input 306. The Vbus input 302 is coupled to a comparator 312 that outputs the higher of Vbus or Vref. The outputs of the comparator 312 and the crude sensors 308 and 310 are evaluated by an OR element 314 which outputs a detection signal 316. The detection signal 316 is processed by additional logic elements 318, 320, and 322 to produce a Type-A to Type-C cable flag signal 324. The output of the logic element 320 also triggers a timer 326, sometimes referred to as a TccDebounce timer. Thus, the logic element 322 samples Vbus as the timer 326 begins. In this manner, the flag signal 324 indicates whether or not a cable inserted into the USB receptacle 202 is a legacy Type-A to Type-C cable. The absence of the flag signal 324 indicates that the cable is a Type-C to Type-C cable.

Figure 4A:
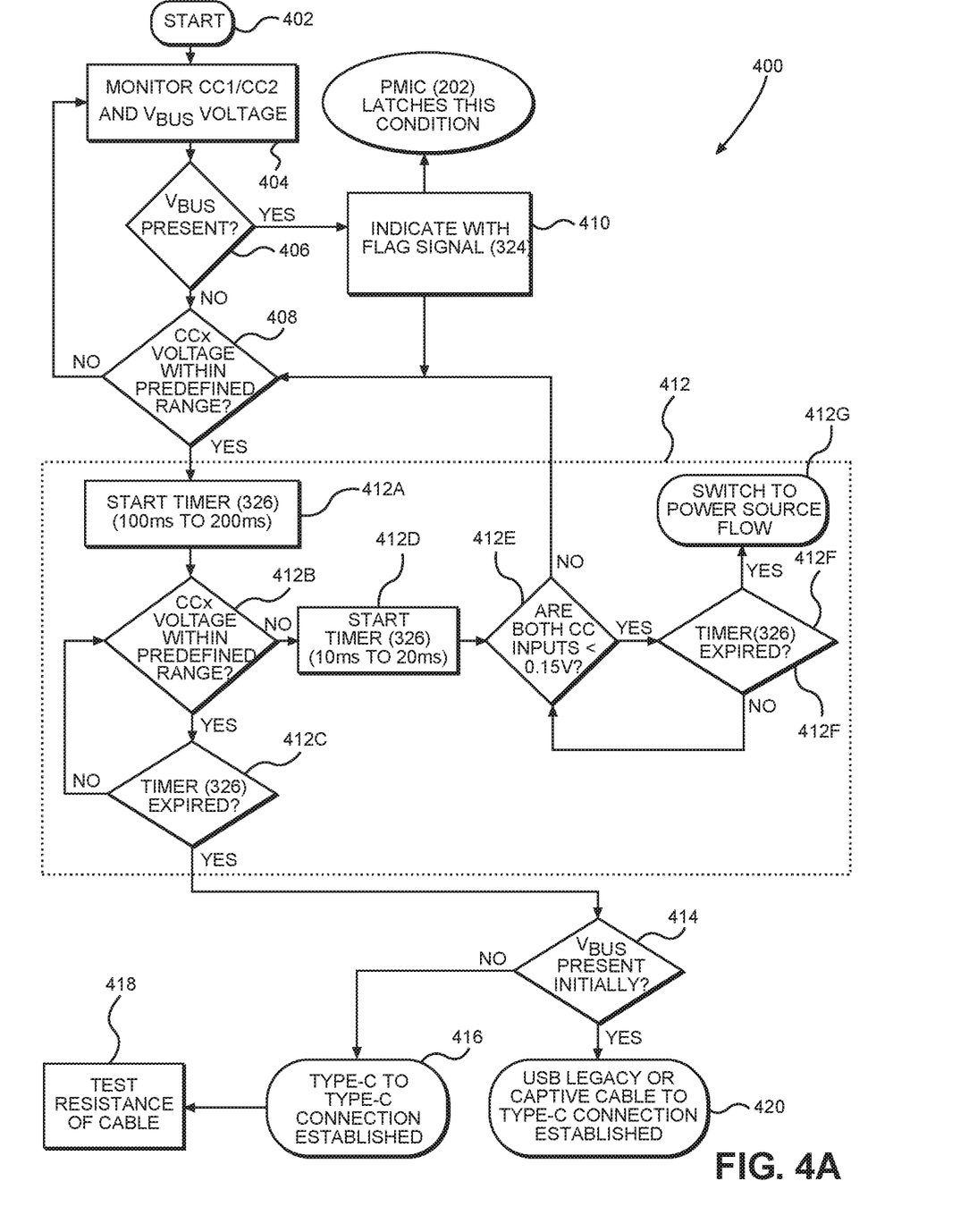
FIG. 4A illustrates a flowchart of an initial detection process to ascertain whether a cable is legacy or not and compliant or not.
Figure 4B:
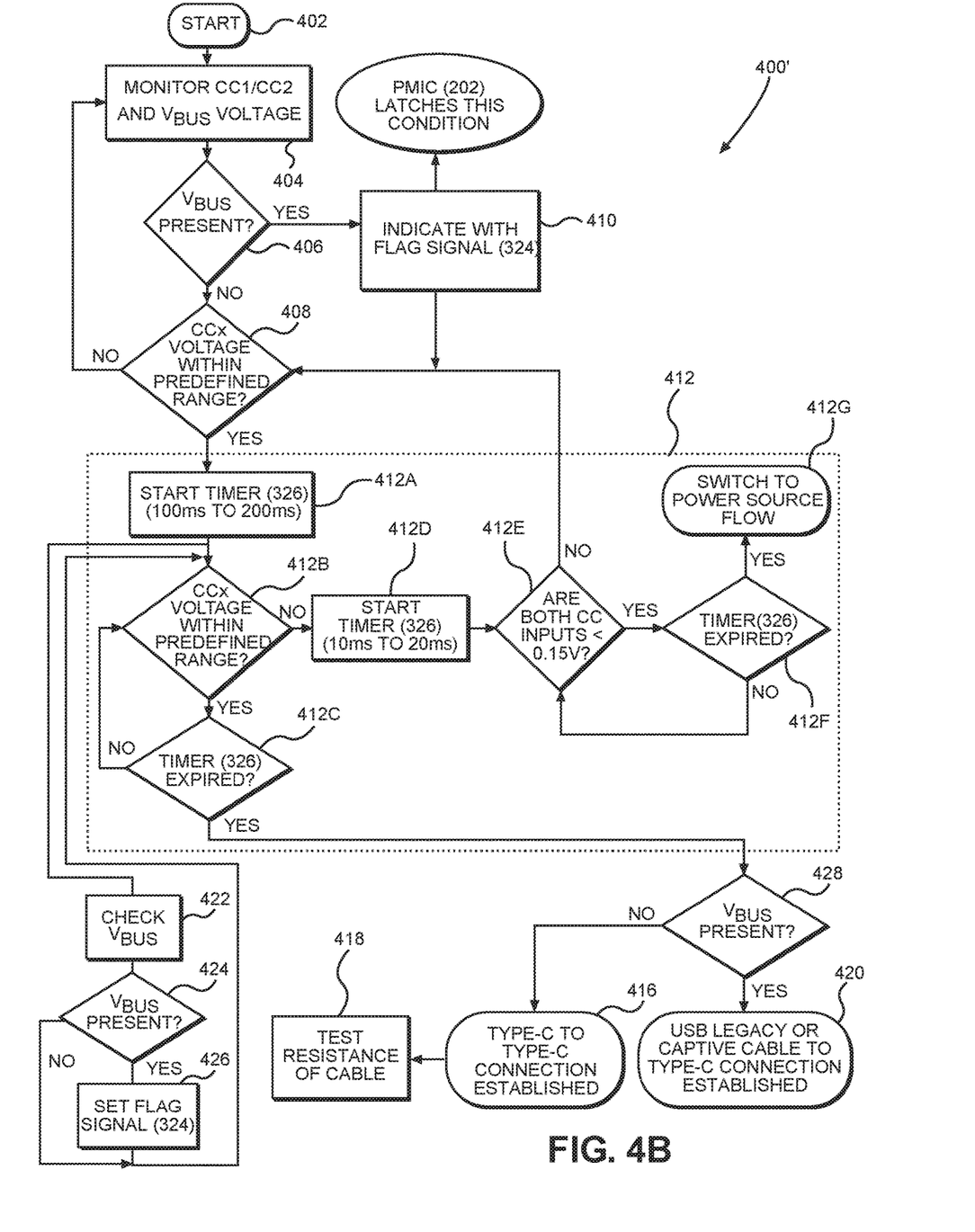
FIG. 4B illustrates a flowchart of an alternate initial detection process to ascertain whether a cable is legacy or not and compliant or not.
Figure 5:
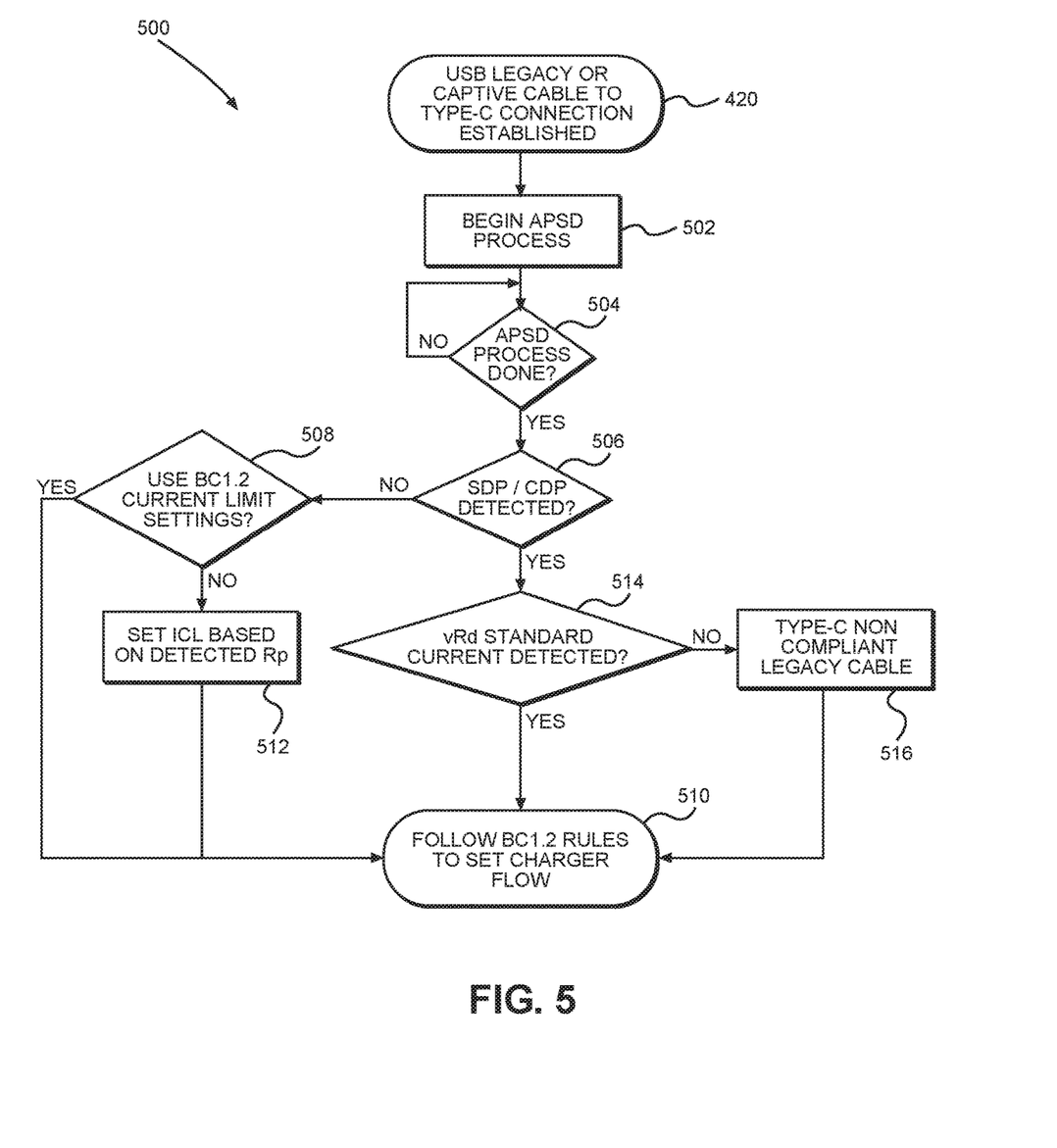
FIG. 5 illustrates a flowchart of a process to determine if a legacy cable is compliant or not-compliant and what current to draw based on that determination.

Against this backdrop of hardware, exemplary aspects of the present disclosure use a process at a device such as the device 200 of FIG. 2 to determine a type and capability of a cable attached thereto. Additional investigation may be performed on the nature of the source and what currents may be drawn safely. In this regard, FIGS. 4A, 4B, and 5 illustrate flowcharts associated with such processes. FIG. 4A illustrates a process 400 that starts at block 402. The device 200 monitors the voltages present at the CC1 input 304 and the CC2 input 306 as well as the Vbus input 302 (block 404). Based on this monitoring, the sensor circuit 300 determines if there is a non-zero voltage at the Vbus input 302 (block 406). If there is no voltage at the Vbus input 302, the sensor circuit 300 determines if there is a voltage at the CC1 input 304 or the CC2 input 306 that is within a predefined range (block 408). In most cases, the predefined range is whether the voltage is above a predefined threshold. If the answer to block 408 is no, then the monitoring continues (block 404). If the answer to block 406 is yes, there is a non-zero voltage present at the Vbus input 302, the sensor circuit 300 indicates this with an interrupt request (i.e., the flag signal 324) (block 410), and the PMIC 204 latches this condition. After latching this condition, the process 400 moves to block 408, already described.

With continued reference to FIG. 4, if the voltage at one of the CC inputs 304 or 306 is within the predefined range then the PMIC 204 enters a test to see if the device 200 is supposed to be a charging element (i.e., entering a power source flow) (block 412).

Note that the steps in block 412 are part of the USB specification and specifically are designed to test to see if the device 200 is supposed to be a power source or a power sink. In this regard, block 412 starts the timer 326 for approximately 100 to 200 milliseconds (ms) (block 412A). The PMIC 204 monitors the voltage at the CC inputs 304 and 306 to determine if the voltage thereat is within a predefined range (block 412B). If the answer to block 412B is yes, then the PMIC 204 determines if the timer 326 has expired (block 412C). If the answer to block 412C is negative, block 412 loops internally back to block 412B. If the answer to block 412C is yes, the timer 326 has expired, then the device 200 concludes that the device 200 is supposed to be a power sink, and the process 400 continues. If, however, the answer to block 412B is no, the voltage at the CC inputs 304 and 306 is not within the predefined range, then the timer 326 is restarted for 10 to 20 ms (block 412D). The PMIC 204 determines if both of the CC inputs 304 and 306 are below 0.15 V (block 412E). If the answer to block 412E is no, then the process of block 412 exits to block 408 of the process 400, concluding that the device 200 is a power sink, but that there may not be a signal at the USB receptacle 202. If, however, the answer to block 412E is yes, one or both inputs 302 and/or 304 have non-zero voltage levels, the PMIC 204 determines if the levels stay elevated for a duration of the timer 326—i.e., has the timer 326 expired (block 412F). If the answer to block 412F is yes, then the PMIC 204 determines that the device 200 is to be a power source and switches to the power source flow accordingly (block 412G).

With continued reference to FIG. 4A, if the timer 326 has expired (i.e., the answer to block 412C is yes), then the PMIC 204 recalls whether the Vbus was present initially (block 414) as indicated by the condition latch set in block 410. If the Vbus was not present initially, then the PMIC 204 concludes that a Type-C to Type-C connection has been established (block 416). Because there may be an adaptor such as the connector adaptor 142, the PMIC 204 then tests the resistance of the cable (block 418). In an exemplary aspect, the resistance of the cable may be tested as set forth in U.S. Patent Application Publication No. 2015/0362944, application Ser. No. 14/303,883, filed Jun. 13, 2014, which is hereby incorporated by reference in its entirety. If the resistance of the cable indicates that the cable is other than a Type-C cable, then the device 200 may act on this determination rather than treating the cable as a Type-C cable. It should be appreciated that the USB specification sets the resistance of the cable at 250 milli-ohms (mΩ), and the resistance testing tests for this value.

With continued reference to FIG. 4A, if the Vbus was initially present at the determination of block 414, the PMIC 204 concludes that a legacy or captive (e.g., a wall charger) cable is being used (block 420). The process 400 then proceeds to process 500 described in FIG. 5 below to ascertain what current levels may be used with the legacy or captive cable.

It is possible that a cable may include an over-voltage switch which causes a voltage to appear at the Vbus input 302 of the cable some time after the appearance of a voltage at the CC inputs 304 and 306. In such a situation, if the process 400 is followed, the PMIC 204 may incorrectly conclude that the cable is a Type-C to Type-C cable because the flag signal 324 is not set at block 406. The present disclosure addresses such situations by providing a process 400' illustrated in FIG. 4B. The process 400' is substantially similar to the process 400, but at block 412A, an additional check is made after the start of the timer 326 to see if a voltage is now present at the Vbus input 302 (block 422), and the PMIC 204 determines if the Vbus is present (block 424). If the Vbus is present at this later time, the flag signal 324 is set (block 426), and the process returns to block 412B as previously described. If the Vbus is not present, no flag is set, and the process 400' returns to block 412B as previously described. After expiration of the timer 326 at block 412C, the PMIC 204 checks if the Vbus was present (either initially or after the timer 326 is started) (block 428). Based on whether the Vbus was present, the process 400' continues to block 416 or 420 previously described.

Turning now to FIG. 5, the process 500 starts at block 420, reproduced in FIG. 5. After determining that the cable is a legacy or captive cable, the PMIC 204 begins an automatic power source detection (APSD) process (block 502). The PMIC 204 determines if the APSD process is done (block 504) for as long as the APSD process is running. Once the APSD process is done, the PMIC 204 determines if a standard downstream port (SDP) or charging downstream port (CDP) (as opposed to a dedicated charging port (DCP), which might be a wall charger) is detected (block 506). If the answer to block 506 is no, the PMIC 204 determines whether to use battery charger (BC) rules 1.2 to detect a current limit setting (block 508). If the answer to block 508 is yes, then the PMIC 204 uses the BC rules 1.2 to set the charger flow (block 510). If the answer to block 508 is no, then the PMIC 204 sets the input current limit (ICL) to a value based on the detected Rp (a resistance on the CC pin of the cable) (block 512) and then runs the BC rules 1.2 (block 510).

With continued reference to FIG. 5, if an SDP or CDP is detected at block 506, then the PMIC 204 determines if the vRd standard current (i.e., the current at the CC input) is detected (block 514). Put another way, the voltage measured at the CC input indicates the current capability of the attached power source. Likewise, while illustrated as vRd standard current, it should be appreciated that the vRd standard current is the same thing as the Rp standard current.

If the answer to block 514 is yes, then the PMIC 204 runs the BC rules 1.2 (block 510). If the answer to block 514 is no, then the PMIC 204 concludes that the cable is a non-compliant legacy cable (block 516) and sets the current limit accordingly using the BC rules 1.2 (block 510).

Note that the functionality of the present disclosure may be located in a dongle or other intermediate device (not illustrated) instead of the PMIC 204. Such dongle or intermediate device allows a cable to be plugged in to a first connector and has a complementary connector that plugs into the device 200.

The USB cable type detection and control techniques according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
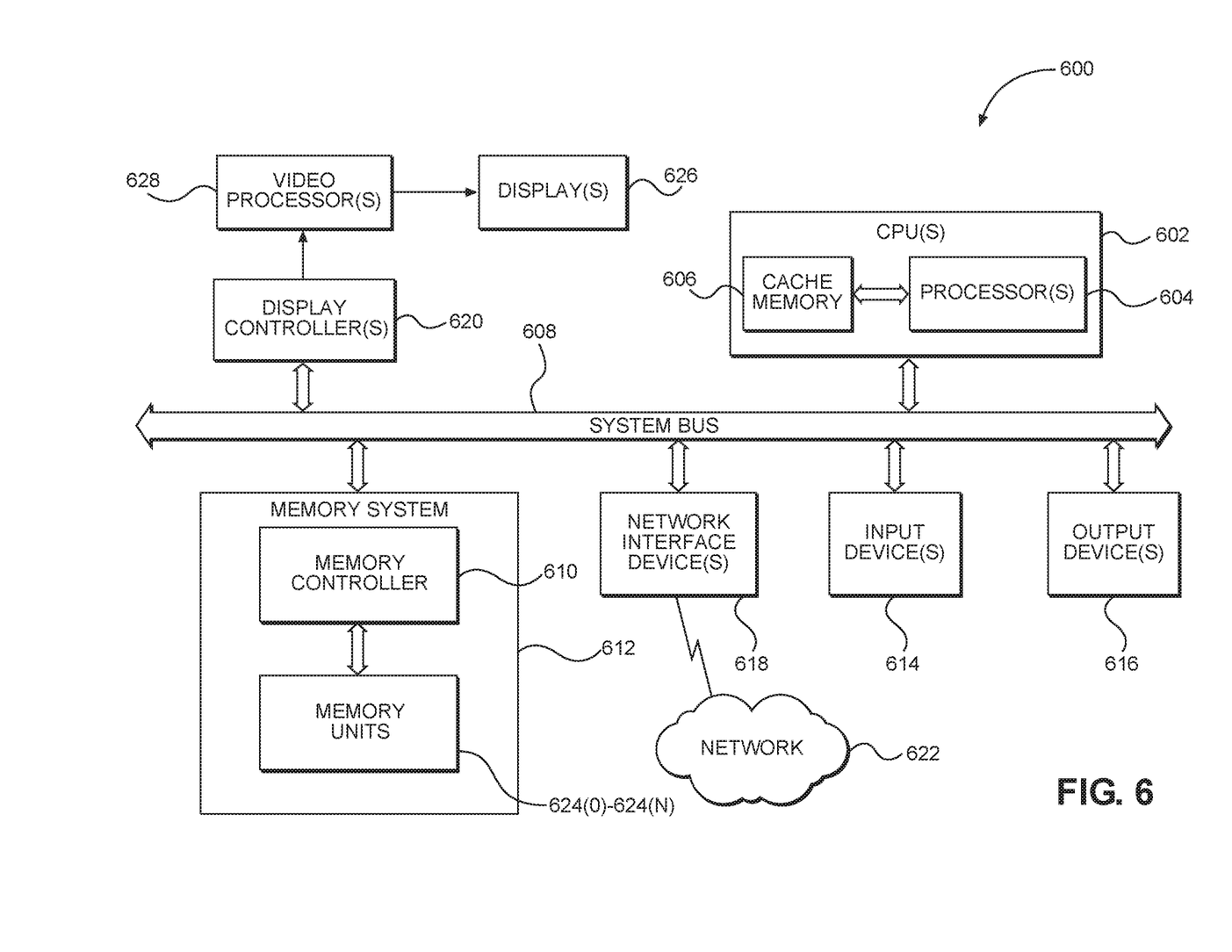
FIG. 6 is a block diagram of an exemplary processor-based system that can include a USB receptacle and sensor, such as the sensor of FIG. 3, and that implements the processes of FIGS. 4A, 4B, and 5.

In this regard, FIG. 6 illustrates an example of a processor-based system 600 that can employ the USB cable type detection and control techniques illustrated in FIG. 3-5. In this example, the processor-based system 600 includes one or more central processing units (CPUs) 602, each including one or more processors 604. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 602. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0-N). It should be appreciated that the connection from the system bus 608 to an input device 614, an output device 616, or a network interface device 618 could be through a USB receptacle and USB cable, and aspects of the present disclosure may be implemented in conjunction with such USB receptacle. Alternatively, or in addition, the processor-based system 600 may act as a power source to a second computing device through a USB receptacle and cable (e.g., a phone is plugged into a desktop computer through a cable) or the processor-based system 600 may act as a power sink for a second computing device through a USB receptacle and cable (e.g., a phone is plugged into a tablet).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any Type and size of memory and may be configured to store any Type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for controlling current levels on a Universal Serial Bus (USB) cable, comprising:
   detecting whether a cable is a legacy Type-A to Type-C cable;
   detecting whether the cable is compliant or not compliant with a USB Type-C specification; and
   setting a current draw based on whether the cable is legacy or not legacy and on whether the cable is compliant or not compliant with the USB Type-C specification.

2. The method of claim 1, wherein detecting whether the cable is compliant or not compliant with the USB Type-C specification comprises determining a voltage level at a command and control (CC) input.

3. The method of claim 1, wherein detecting whether the cable is the legacy Type-A to Type-C cable comprises detecting whether a voltage is initially present at a Vbus input.

4. The method of claim 1, further comprising determining if an attached charger is a standard downstream port (SDP) or a charging downstream port (CDP).

5. The method of claim 4, further comprising concluding the cable is non-compliant with the USB Type-C specification if the attached charger is the SDP or the CDP.

6. The method of claim 1, wherein setting the current draw comprises limiting the current draw to no more than 1.5 amperes (A) if the cable is a non-compliant legacy cable.

7. The method of claim 1, wherein the method is performed in a dongle attached between the cable and a device.

8. A dongle comprising:
   a first interface configured to attach to a Universal Serial Bus (USB) cable;
   a second interface configured to plug into a USB device; and
   a control system operatively coupled to the first interface and the second interface and configured to:
      detect whether a cable plugged into the first interface is a legacy Type-A to Type-C cable;
      detect whether the cable is compliant or not compliant with a USB Type-C specification; and
      set a current draw based on whether the cable is legacy or not legacy and on whether the cable is compliant or not compliant with the USB Type-C specification.

9. A Universal Serial Bus (USB) device comprising:
   a receptacle configured to receive a USB cable; and
   a control system operatively coupled to the receptacle and configured to:
      detect whether a cable plugged into the receptacle is a legacy Type-A to Type-C cable;
      detect whether the cable is compliant or not compliant with a USB Type-C specification;
      detect whether a remote device on a remote end of the cable is compliant or not compliant with the USB Type-C specification; and
      set a current draw based on whether the cable is legacy or not legacy and on whether the cable is compliant or not compliant with the USB Type-C specification.

10. The USB device of claim 9, wherein the control system comprises a power management integrated circuit (PMIC).

11. The USB device of claim 10, wherein the PMIC comprises a first crude sensor associated with a command and control (CC) input of the receptacle, the first crude sensor configured to sense first voltage levels at the CC input.

12. The USB device of claim 11, wherein the PMIC comprises a second crude sensor associated with a second CC input of the receptacle, the second crude sensor configured to sense second voltage levels at the second CC input.

13. The USB device of claim 11, wherein the PMIC further comprises a timer.

14. The USB device of claim 9, wherein the control system is further configured to set a signal flag in response to voltage levels above a predefined threshold at a Vbus input of the receptacle.

15. The USB device of claim 9, wherein the receptacle comprises a USB Type-C receptacle.

16. The USB device of claim 9, wherein the control system is configured to detect whether the cable is compliant or not compliant with the USB Type-C specification by determining a voltage level at a command and control (CC) input.

17. The USB device of claim 9, wherein the control system is configured to detect whether the cable is the legacy Type-A to Type-C cable by detecting whether a voltage is initially present at a Vbus input.

18. The USB device of claim 9, wherein the control system is further configured to determine if an attached charger is a standard downstream port (SDP) or a charging downstream port (CDP).

19. The USB device of claim 18, wherein the control system is further configured to conclude the cable is non-compliant with the USB Type-C specification if the attached charger is the SDP or the CDP.

20. The USB device of claim 9, wherein setting the current draw comprises limiting the current draw to no more than 1.5 amperes (A) if the cable is a non-compliant legacy cable.

21. The USB device of claim 9 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *